US012617902B2

(12) United States Patent
Uera et al.

(10) Patent No.: US 12,617,902 B2
(45) Date of Patent: May 5, 2026

(54) COMPOSITION AND SILOXANE-BASED THERMOPLASTIC RESIN USING SAME, AND METHODS FOR PRODUCING SAME

(71) Applicant: MITSUBISHI GAS CHEMICAL COMPANY, INC., Tokyo (JP)

(72) Inventors: Kazuyoshi Uera, Tokyo (JP); Kohei Kamatani, Tokyo (JP); Hisato Akimoto, Tokyo (JP); Daisuke Taguchi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 572 days.

(21) Appl. No.: 18/026,697

(22) PCT Filed: Sep. 22, 2021

(86) PCT No.: PCT/JP2021/034673
§ 371 (c)(1),
(2) Date: Mar. 16, 2023

(87) PCT Pub. No.: WO2022/065327
PCT Pub. Date: Mar. 31, 2022

(65) Prior Publication Data
US 2023/0340177 A1 Oct. 26, 2023

(30) Foreign Application Priority Data
Sep. 23, 2020 (JP) ................................ 2020-158422

(51) Int. Cl.
*C08G 77/52* (2006.01)
*C08G 77/16* (2006.01)
(Continued)

(52) U.S. Cl.
CPC ............. *C08G 77/52* (2013.01); *C08G 77/16* (2013.01); *C08G 77/42* (2013.01); *C08G 77/448* (2013.01)

(58) Field of Classification Search
CPC ......... C08G 77/48; C08G 77/50; C08G 77/52
(Continued)

(56) References Cited

U.S. PATENT DOCUMENTS 6,258,968 B1 * 7/2001 Eversheim ............. C08G 77/10 556/425
11,535,697 B2 12/2022 Jaehnigen et al.
(Continued)

FOREIGN PATENT DOCUMENTS

CN 105348811 B 2/2018
CN 110078925 A 8/2019
(Continued)

OTHER PUBLICATIONS

International Search Report issued Nov. 30, 2021, in International Bureau of WIPO Patent Application No. PCT/JP2021/034673, along with an English translation thereof.
(Continued)

*Primary Examiner* — Marc S Zimmer
(74) *Attorney, Agent, or Firm* — GREENBLUM & BERNSTEIN, P.L.C.

(57) ABSTRACT

To provide a composition containing a siloxane block-containing diol compound that is easy to manufacture industrially.

A composition containing a siloxane block-containing diol compound, wherein the siloxane block-containing diol compound is represented by the following formula (I):

(I)

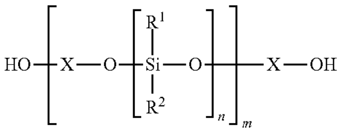

wherein $R^1$ and $R^2$ are each independently an alkyl group having 1 to 20 carbon atoms which may have a substituent, or an aryl group having 6 to 30 carbon atoms which may have a substituent, m is an integer of 1 to 25, n is an integer of 3 to 200, and Xs each independently represent any of the following formulae ($I^1$) to ($I^6$):

($I^1$)

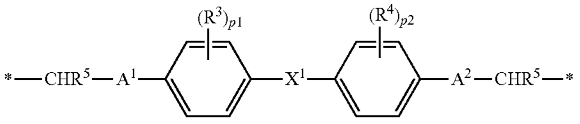

($I^2$)

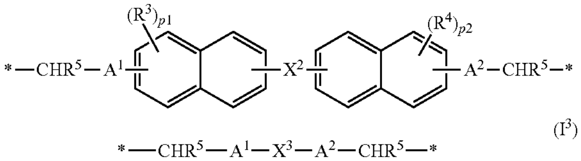

($I^3$)

$$*-CHR^5-A^1-X^3-A^2-CHR^5-*$$

($I^4$)

$$*-CHR^5-A^1-X^4-A^2-CHR^5-*$$

($I^5$)

$$*-CHR^5-A^1-X^5-A^2-CHR^5-*$$

($I^6$)

$$*-CHR^5-[-(X^6)_{s1}-CHR^5]_{s2}-*.$$

4 Claims, No Drawings

(51) Int. Cl.
*C08G 77/42* (2006.01)
*C08G 77/448* (2006.01)

(58) Field of Classification Search
USPC ........................................................ 528/29, 37
See application file for complete search history.

(56) References Cited

U.S. PATENT DOCUMENTS

| | | | |
|---|---|---|---|
| 11,725,075 | B2 | 8/2023 | Jaehnigen et al. |
| 2008/0199796 | A1 | 8/2008 | Minemura et al. |
| 2010/0029861 | A1 | 2/2010 | Esselborn et al. |
| 2016/0251483 | A1 | 9/2016 | Huggins et al. |
| 2020/0231739 | A1 | 7/2020 | Jaehnigen et al. |
| 2022/0033566 | A1 | 2/2022 | Jaehnigen et al. |

FOREIGN PATENT DOCUMENTS

| | | | | | |
|---|---|---|---|---|---|
| CN | 110922600 | A | | 3/2020 | |
| CN | 111094378 | A | | 5/2020 | |
| GB | 2170814 | A | * | 8/1986 | ........... C08G 77/445 |
| JP | 2008-195905 | A | | 8/2008 | |
| JP | 2010-511084 | A | | 4/2010 | |
| JP | 2016-538362 | A | | 12/2016 | |

OTHER PUBLICATIONS

Written Opinion issued Nov. 30, 2021, in International Bureau of WIPO Patent Application No. PCT/JP2021/034673, along with an English translation thereof.
Supplementary European Search Report dated on Feb. 21, 2024 in family member European Patent Application No. 21872456.5.

* cited by examiner

COMPOSITION AND SILOXANE-BASED THERMOPLASTIC RESIN USING SAME, AND METHODS FOR PRODUCING SAME

TECHNICAL FIELD

The present invention relates to a composition and a siloxane-based thermoplastic resin using the same, and a method for producing the same.

BACKGROUND ART

Conventionally, it has been known that a siloxane block-containing diol compound is effective as various resin raw materials containing a silicon block in a structure, and for example, the siloxane block-containing diol compound is used for applications such as a release layer in photocopying, a photoresist material, a plasticizer for polycarbonate, a component of a powder surface coating system, and the like.

When the siloxane block-containing diol compound having a hydroxy group at the terminal is copolymerized with poly carbonate, for example, the siloxane block-containing diol compound can impart functions such as chemical resistance, low-temperature impact resistance, weather resistance, flame retardancy, and the like to polycarbonate.

As such a siloxane block-containing diol compound, Patent Document 1 describes that siloxane block-containing diol compounds (hydroxyaryl-terminated polysiloxanes) represented by the following formulas (a) to (c) are preferable.

(a)

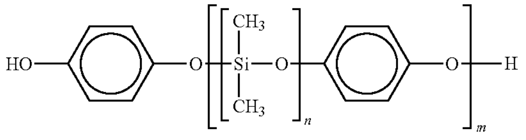

(b)

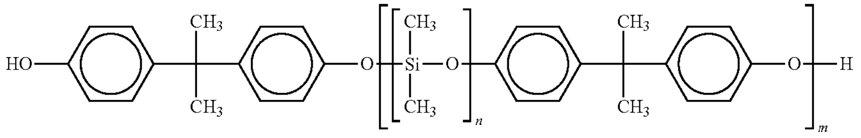

(c)

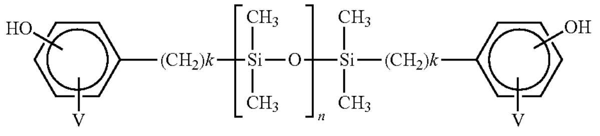

Patent Document 1 describes that a polydiorganosiloxane-polyorganoblock copolymer is produced by a solvent-free melting method by adding a predetermined inorganic salt and/or organic salt to the siloxane block-containing diol compound as described above, thereby improving the melt stability, decomposition stability to a solvent and water, and low-temperature impact resistance of the resulting copolymer, and the like.

PRIOR ART DOCUMENTS

Patent Document 1: JP 2016-538362 A

SUMMARY OF INVENTION

Problems to Be Solved by the Invention

However, it has been found that the siloxane block-containing diol compound described in Patent Document 1 as described above has low reactivity between a siloxane compound and a diol compound as a raw material, and may be difficult to industrially produce.

Therefore, the present invention provides a composition containing a siloxane block-containing diol compound that is easy to industrially produce.

Means for Solving the Problems

The present inventors have conducted intensive studies to solve the above problem. As a result, the present inventors have found that the above problem can be solved by forming a siloxane block-containing diol compound into a predetermined structure, and have completed the present invention. That is, the present invention is, for example, as follows.

[1] A composition comprising a siloxane block-containing diol compound, wherein the siloxane block-containing diol compound is represented by the following formula (I):

(I)

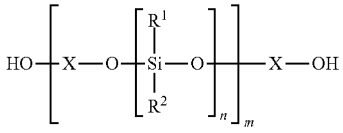

wherein $R^1$ and $R^2$ are each independently an alkyl group having 1 to 20 carbon atoms which may have a substituent, or an aryl group having 6 to 30 carbon atoms which may have a substituent, m is an integer of 1 to 25, n is an integer of 3 to 200, Xs each independently represent any of the following formulae ($I^1$) to ($I^6$):

($I^1$)

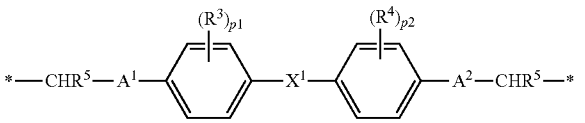

($I^2$)

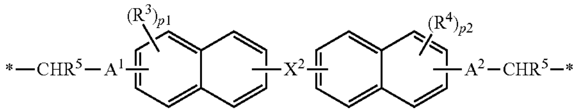

($I^3$)

$$*—CHR^5—A^1—X^3—A^2—CHR^5—*$$

($I^4$)

$$*—CHR^5—A^1—X^4—A^2—CHR^5—*$$

($I^5$)

$$*—CHR^5—A^1—X^5—A^2—CHR^5—*$$

($I^6$)

$$*—CHR^5—[(X^6)_{s1}—CHR^5]_{s2}—*$$

wherein $A^1$ and $A^2$ are each independently —$(CR^{6A}R^{6B})_{q1}$— or —(O—$(CR^{6A}R^{6B})_{q2})_{q3}$—, wherein $R^{6A}$ and $R^{6B}$ are each independently H or an alkyl group having 1 to 6 carbon atoms, q1 is an integer of 0 to 10, q2 is an integer of 0 to 10, and q3 is an integer of 0 to 10, $R^3$ and $R^4$ each independently represent a halogen atom, an aliphatic hydrocarbon group having 1 to 20 carbon atoms, an alkoxyl group having 1 to 20 carbon atoms, a cycloalkyl group having 3 to 20 carbon atoms, an aromatic hydrocarbon group having 6 to 20 carbon atoms, an aralkyl group having 7 to 20 carbon atoms, an aromatic hydrocarbon-oxy group having 6 to 20 carbon atoms, or a cycloalkoxyl group having 3 to 20 carbon atoms, p1 and p2 are each independently an integer of 0 to 4, $R^5$s each independently represent H or an alkyl group having 1 to 6 carbon atoms, $X^1$ and $X^2$ are each independently a single bond or a group shown below:

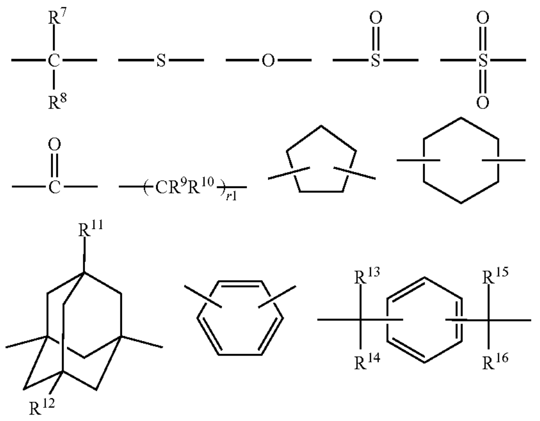

-continued

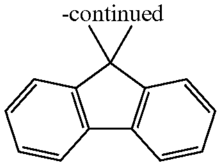

wherein $R^7$ and $R^8$ are each independently H, a halogen atom, an aliphatic hydrocarbon group having 1 to 20 carbon atoms which may have a substituent, an alkoxyl group having 1 to 20 carbon atoms which may have a substituent, or an aromatic hydrocarbon group having 6 to 20 carbon atoms which may have a substituent, or $R^7$ and $R^8$ may be bonded to each other to form a carbocyclic ring having 3 to 20 carbon atoms or a 5 to 12 membered heterocycle, $R^9$ and $R^{10}$ each independently represent H or an alkyl group having 1 to 6 carbon atoms, $R^{11}$ to $R^{16}$ each independently represent a halogen atom, an aliphatic hydrocarbon group having 1 to 20 carbon atoms which may have a substituent, an alkoxyl group having 1 to 20 carbon atoms which may have a substituent, or an aromatic hydrocarbon group having 6 to 12 carbon atoms which may have a substituent, r1 is an integer of 2 to 20, $X^3$s each independently represent a divalent aromatic hydrocarbon group having 15 to 32 carbon atoms, $X^4$s each independently represent a divalent group containing one or more hydrocarbon rings or heterocycles, wherein the divalent group containing one or more hydrocarbon rings or heterocycles may be formed by bonding together with at least one selected from the group consisting of $R^5$, 6$^{6A}$, and $R^{6B}$, $X^5$s each independently represent a divalent saturated heterocyclic group, wherein the divalent saturated heterocyclic group may be formed by bonding together with at least one selected from the group consisting of $R^5$, $R^{6A}$, and $R^{6B}$, $X^6$s each independently represent an alkylene group having 1 to 10 carbon atoms which may contain an oxygen atom, and s1 and s2 are each independently an integer of 0 to 10.

[2] A siloxane-based thermoplastic resin containing a constituent unit derived from the siloxane block-containing diol compound described in [1] above.

[3] A method for producing the composition described in [1] above, including a step of reacting (A) a cyclic siloxane compound represented by the following formula (1):

(1)

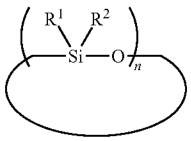

wherein $R^1$ and $R^2$ are each independently an alkyl group which may have a substituent, an alkenyl group which may have a substituent, or an aryl group which may have a substituent, and n is an integer of 3 to 30, and/or a linear siloxane compound represented by the following formula (2):

(2)

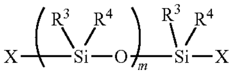

wherein $R^3$ and $R^4$ are each independently an alkyl group which may have a substituent, an alkenyl group which may have a substituent, or an aryl group which may have a substituent, Xs each independently represent a hydrogen atom, a hydroxyl group, an alkoxy group having 1 to 10 carbon atoms which may have a substituent, a siloxy group having 1 to 10 carbon atoms which may have a substituent, a hydrocarbon group having 1 to 10 carbon atoms which may have a substituent, an oxygen atom-containing group having 1 to 10 carbon atoms which may have a substituent, a nitrogen atom-containing group having 1 to 10 carbon atoms which may have a substituent, or an amino group which may have a substituent, and m is an integer of 2 to 10000, (B) a diol compound represented by any of the following formulae ($J^1$) to ($J^6$):

($J^1$)

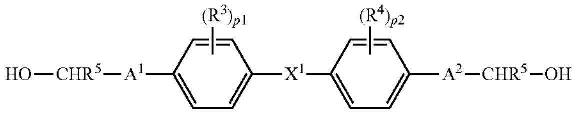

($J^2$)

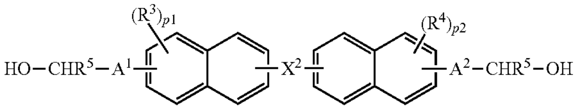

($J^3$)

$$HO—CHR^5—A^1—X^3—A^2—CHR^5—OH$$

($J^4$)

$$HO—CHR^5—A^1—X^4—A^2—CHR^5—OH$$

($J^5$)

$$HO—CHR^5—A^1—X^5—A^2—CHR^5—OH$$

($J^6$)

$$HO—CHR^5—[(X^6)_{s1}—CHR^5]_{s2}—OH$$

wherein $A^1$ and $A^2$, $X^1$ to $X^6$, $R^3$ to $R^5$, p1 to p2, and s1 to s2 are the same as defined in [1] above, and (C) a basic compound catalyst.

[4] A method for producing a siloxane-based thermoplastic resin, including a step of reacting the composition described in [1] above with a thermoplastic resin at 160 to 400° C. in the presence of a catalyst.

Advantageous Effects of Invention

According to the present invention, there is provided a composition comprising a siloxane block-containing diol compound which is easy to produce industrially.

DESCRIPTION OF EMBODIMENTS

Hereinafter, embodiments for carrying out the present invention will be described in detail.

Composition

The composition of the invention contains a siloxane block-containing diol compound. The composition may further contain impurities derived from raw materials such as a cyclic siloxane compound, a linear siloxane compound, a diol compound, a basic compound catalyst, and the like, and decomposition products thereof.

Siloxane Block-Containing Diol Compound

The siloxane block-containing diol compound is represented by the following formula (I).

In the formula (I), a carbon atom bonded to a hydroxyl group in X (—$CHR^5$— in the formulas ($I^1$) to ($I^6$)) is a primary carbon atom or a secondary carbon atom. This increases the reactivity between the diol compound that derives the constituent unit of X and the cyclic siloxane compound and/or the linear siloxane compound that derives the siloxane block. As a result, the compound represented by the formula (I), that is, the siloxane block-containing diol compound can be easily industrially produced.

(I)

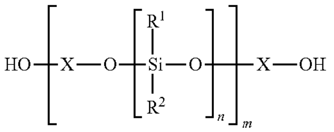

In the above formula, $R^1$ and $R^2$ are each independently an alkyl group having 1 to 20 carbon atoms which may have a substituent and an aryl group having 6 to 30 carbon atoms which may have a substituent.

The alkyl group having 1 to 20 carbon atoms is not particularly limited, and examples thereof include methyl, ethyl, n-propyl, isopropyl, n-butyl, isobutyl, s-butyl, t-butyl, n-pentyl, n-hexyl, n-octyl, n-decyl, n-pentadecyl, n-icosyl, and the like. Among them, the alkyl group having 1 to 20 carbon atoms is preferably an alkyl group having 1 to 10 carbon atoms, more preferably an alkyl group having 1 to 6 carbon atoms, further preferably an alkyl group having 1 to 4 carbon atoms, particularly preferably an alkyl group having 1 to 2 carbon atoms, and most preferably methyl.

The aryl group having 6 to 30 carbon atoms is not particularly limited, and examples thereof include phenyl, indenyl, naphthyl, biphenyl, acenaphthenyl, fluorenyl, phenalenyl, phenanthrenyl, anthracenyl, triphenylenyl, pyrenyl, chrysenyl, naphthacenyl, perylenyl, and the like. Among them, the aryl group having 6 to 30 carbon atoms is preferably an aryl group having 6 to 12 carbon atoms, and more preferably phenyl.

The substituent of $R^1$ and $R^2$ is not particularly limited, and examples thereof include a hydroxyl group, a halogen atom, an amino group, a vinyl group, a carboxyl group, a cyano group, a (meth) acryloxy group, a glycidyloxy group, a mercapto group, and the like. In the present specification, the "amino group" includes, in addition to an unsubstituted amino group (—$NH_2$), a monoalkylamino group substituted with one alkyl group having 1 to 6 carbon atoms and a dialkylamino group substituted with two alkyl groups having 1 to 6 carbon atoms. Specific examples of the amino group include, but are not particularly limited to, amino (—$NH_2$); monoalkylamino groups such as methylamino, ethylamino, n-propylamino, isopropylamino, n-butylamino, isobutylamino, t-butylamino, n-pentylamino, n-hexylamino, and the like; dialkylamino groups such as dimethylamino, diethylamino, di(n-propyl)amino, diisopropylamino, di(n-butyl)amino, diisobutylamino, di(n-pentyl)amino, di(n-hexyl)amino, ethylmethylamino, methyl(n-propyl)amino, n-butylmethylamino, ethyl(n-propyl)amino, n-butylethylamino, and the like. Among them, the amino group is preferably an unsubstituted amino group ($-NH_2$).

m is an integer of 1 to 25, preferably 1 to 20, and more preferably 3 to 15.

n is an integer of 3 to 200, preferably 3 to 100, more preferably 3 to 50, and still more preferably 3 to 10.

Xs are each independently represented by the following formulas ($I^1$) to ($I^6$).

($I^1$)

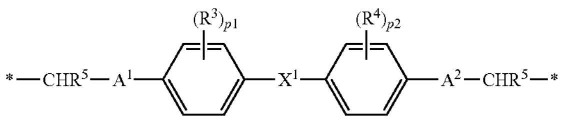

($I^2$)

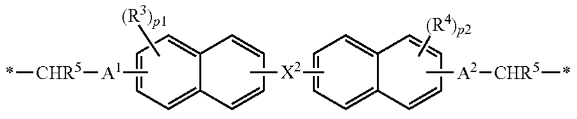

($I^3$)

$$*-CHR^5-A^1-X^3-A^2-CHR^5-*$$

($I^4$)

$$*-CHR^5-A^1-X^4-A^2-CHR^5-*$$

($I^5$)

$$*-CHR^5-A^1-X^5-A^2-CHR^5-*$$

($I^6$)

$$*-CHR^5-[(X^6)_{s1}-CHR^5]_{s2}-*$$

That is, in the formula (I), $-CHR^5-$ to which a hydroxyl group is bonded is a primary carbon atom or a secondary carbon atom.

$A^1$ and $A^2$ are each independently $-(CR^{6A}R^{6B})_{q1}-$ or $-(O-(CR^{6A}R^{6B})_{q2})_{q3}-$.

Here, $R^{6A}$ and $R^{6B}$ are each independently H or an alkyl group having 1 to 6 carbon atoms.

Examples of the alkyl group having 1 to 6 carbon atoms include methyl, ethyl, n-propyl, isopropyl, n-butyl, isobutyl, s-butyl, t-butyl, n-pentyl, n-hexyl, and the like.

q1 is an integer of 0 to 10, preferably 0 to 5, and more preferably 0 to 3.

q2 is an integer of 0 to 10, preferably 0 to 5, and more preferably 0 to 3.

q3 is an integer of 0 to 10, preferably 0 to 5, and more preferably 0 to 3.

$R^3$ and $R^4$ each independently represent a halogen atom, an aliphatic hydrocarbon group having 1 to 20 carbon atoms, an alkoxyl group having 1 to 20 carbon atoms, a cycloalkyl group having 3 to 20 carbon atoms, an aromatic hydrocarbon group having 6 to 20 carbon atoms, an aralkyl group having 7 to 20 carbon atoms, an aromatic hydrocarbon-oxy group having 6 to 20 carbon atoms, or a cycloalkoxyl group having 3 to 20 carbon atoms.

Examples of the halogen atom include a fluorine atom, a chlorine atom, a bromine atom, an iodine atom, and the like.

The aliphatic hydrocarbon group having 1 to 20 carbon atoms is a monovalent aliphatic hydrocarbon group, and examples thereof include, but are not particularly limited to, an alkyl group having 1 to 20 carbon atoms, an alkenyl group having 2 to 20 carbon atoms, and an alkynyl group having 2 to 20 carbon atoms.

The alkyl group having 1 to 20 carbon atoms is not particularly limited, and examples thereof include methyl, ethyl, n-propyl, isopropyl, n-butyl, isobutyl, s-butyl, t-butyl, n-pentyl, n-hexyl, n-octyl, n-decyl, n-pentadecyl, n-icosyl, and the like. Among them, the alkyl group having 1 to 20 carbon atoms is preferably an alkyl group having 1 to 10 carbon atoms, more preferably an alkyl group having 1 to 6 carbon atoms, further preferably an alkyl group having 1 to 4 carbon atoms, particularly preferably an alkyl group having 1 to 2 carbon atoms, and most preferably methyl.

The alkenyl group having 2 to 20 carbon atoms is not particularly limited, and examples thereof include ethenyl (vinyl), 1-propenyl, 2-propenyl (allyl), isopropenyl, 2-butenyl, 3-butenyl, isobutenyl, pentenyl, hexenyl, octenyl, decenyl, pentadecenyl, icosenyl, and the like. Among them, the alkenyl group having 2 to 20 carbon atoms is preferably an alkenyl group having 2 to 10 carbon atoms, more preferably an alkenyl group having 2 to 6 carbon atoms, and still more preferably ethenyl (vinyl) or 2-propenyl (allyl).

The alkynyl group having 2 to 20 carbon atoms is not particularly limited, and examples thereof include ethynyl, 1-propynyl, 2-propynyl, 2-butynyl, 3-butynyl, pentynyl, hexynyl, octynyl, decynyl, pentadecynyl, icosynyl, and the like. Among them, the alkynyl group having 2 to 20 carbon atoms is preferably an alkynyl group having 2 to 10 carbon atoms, more preferably an alkynyl group having 2 to 6 carbon atoms, further preferably an alkynyl group having 2 to 4 carbon atoms, and particularly preferably an alkynyl group having 2 to 3 carbon atoms.

The alkoxyl group having 1 to 20 carbon atoms is a linear or branched monovalent aliphatic hydrocarbon-oxy group having 1 to 20 carbon atoms, and examples thereof include, but are not particularly limited to, methoxy, ethoxy, n-propoxy, isopropoxy, n-butoxy, isobutoxy, t-butoxy, n-pentoxy, n-hexoxy, and the like. Among them, the alkoxyl group having 1 to 20 carbon atoms is preferably an alkoxyl group having 1 to 10 carbon atoms, more preferably an alkoxyl group having 1 to 6 carbon atoms, further preferably an alkoxyl group having 1 to 4 carbon atoms, particularly preferably an alkoxyl group having 1 to 2 carbon atoms, and most preferably methoxy.

The cycloalkyl group having 3 to 20 carbon atoms is a monovalent cyclic saturated aliphatic hydrocarbon group having 3 to 20 carbon atoms, and examples thereof include, but are not particularly limited to, cyclopropyl, cyclobutyl, cyclopentyl, cyclohexyl, adamantyl, and the like. Among them, the cycloalkyl group having 3 to 20 carbon atoms is preferably a cycloalkyl group having 3 to 10 carbon atoms.

The aromatic hydrocarbon group having 6 to 20 carbon atoms is a monovalent aromatic hydrocarbon group having 6 to 20 carbon atoms, and examples thereof include, but are not particularly limited to, phenyl, indenyl, naphthyl, biphenyl, acenaphthenyl, fluorenyl, phenalenyl, phenanthrenyl, anthracenyl, triphenylenyl, pyrenyl, chrysenyl, naphthacenyl, perylenyl, and the like. Among them, the aromatic hydrocarbon group having 6 to 20 carbon atoms is preferably an aromatic hydrocarbon group having 6 to 12 carbon atoms, and more preferably phenyl.

The aralkyl group having 7 to 20 carbon atoms is an alkyl group substituted with one aromatic hydrocarbon group, and examples thereof include, but are not particularly limited to, benzyl, phenethyl, phenylpropyl, naphthylmethyl, naphthylethyl, biphenylmethyl, and the like. Among them, the aralkyl group having 7 to 20 carbon atoms is preferably benzyl.

The aromatic hydrocarbon-oxy group having 6 to 20 carbon atoms is a monovalent aromatic hydrocarbon-oxy group having 6 to 20 carbon atoms, and examples thereof include, but are not particularly limited to, phenoxy, indenyloxy, naphthyloxy, biphenyloxy, acenaphthenyloxy, fluorenyloxy, phenalenyloxy, phenanthrenyloxy, anthracenyloxy, anthracenyloxy, triphenylenyloxy, pyrenyloxy, chrysenyloxy, naphthacenyloxy, perylenyloxy, and the like. Among them, the aromatic hydrocarbon-oxy group having 6 to 20 carbon atoms is preferably an aromatic hydrocarbon-oxy group having 6 to 12 carbon atoms, and more preferably phenoxy.

The cycloalkoxyl group having 3 to 20 carbon atoms is not particularly limited, and examples thereof include cyclopropyloxy, cyclobutyloxy, cyclopentyloxy, cyclohexyloxy, adamantyloxy, cyclododecanyl, and the like. Among them, the cycloalkoxyl group having 3 to 20 carbon atoms is preferably a cycloalkyloxy group having 3 to 12 carbon atoms.

p1 and p2 are each independently an integer of 0 to 4, preferably 0 to 2, and more preferably 0 to 1.

$R^5$s each independently represent H or an alkyl group having 1 to 6 carbon atoms. Here, examples of the alkyl group having 1 to 6 carbon atoms include methyl, ethyl, n-propyl, isopropyl, n-butyl, isobutyl, s-butyl, t-butyl, n-pentyl, n-hexyl, and the like.

$X^1$ and $X^2$ are each independently a single bond or a group shown below.

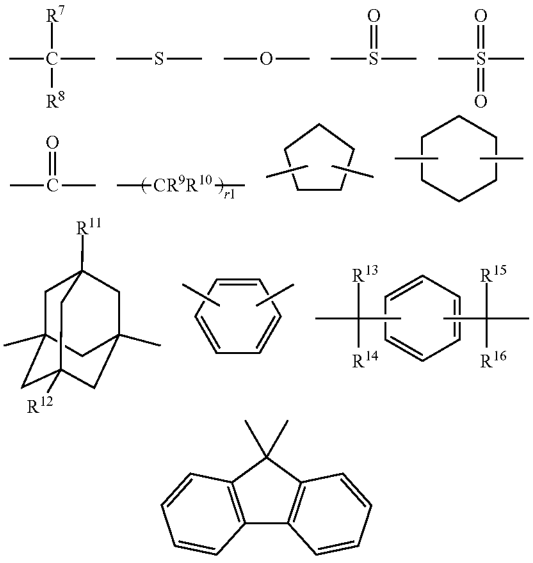

In the above formula, $R^7$ and $R^8$ are each independently H, a halogen atom, an aliphatic hydrocarbon group having 1 to 20 carbon atoms which may have a substituent, an alkoxyl group having 1 to 20 carbon atoms which may have a substituent, or an aromatic hydrocarbon group having 6 to 20 carbon atoms which may have a substituent, or $R^7$ and $R^8$ may be bonded to each other to form a carbocyclic ring having 3 to 20 carbon atoms or a 5 to 12 membered heterocycle.

The aliphatic hydrocarbon group having 1 to 20 carbon atoms, the alkoxyl group having 1 to 20 carbon atoms, and the aromatic hydrocarbon group having 6 to 20 carbon atoms are as described above.

The substituent that can be possessed by the aliphatic hydrocarbon group having 1 to 20 carbon atoms and the alkoxyl group having 1 to 20 carbon atoms is not particularly limited, and examples thereof include an alkoxyl group having 1 to 6 carbon atoms, an acyl group having 1 to 7 carbon atoms, a halogen atom, an amino group, a nitro group, a cyano group, a carbamoyl group, and the like.

On the other hand, the substituent that can be possessed by the aromatic hydrocarbon group having 6 to 20 carbon atoms is not particularly limited, and examples thereof include an alkyl group having 1 to 6 carbon atoms, an alkoxyl group having 1 to 6 carbon atoms, an acyl group having 1 to 7 carbon atoms, a halogen atom, an amino group, a nitro group, a cyano group, a carbamoyl group, and the like.

The carbocyclic ring having 3 to 20 carbon atoms formed by bonding $R^7$ and $R^8$ is not particularly limited, but examples thereof include a condensed ring with a cycloalkyl group having 3 to 20 carbon atoms which may have a substituent, a cycloalkyl group, and an aromatic hydrocarbon group. Examples of the condensed ring include acenaphthenyl, fluorenyl, and the like.

The substituent that the carbocyclic ring having 3 to 20 carbon atoms can have is not particularly limited, and examples thereof include an alkyl group having 1 to 6 carbon atoms, an alkoxyl group having 1 to 6 carbon atoms, an acyl group having 1 to 7 carbon atoms, a halogen atom, an amino group, a nitro group, a cyano group, a carbamoyl group, and the like.

The 5 to 12 membered heterocycle formed by bonding $R^7$ and $R^8$ is not particularly limited, and examples thereof include oxiranyl, aziridinyl, tetrahydrofuranyl, tetrahydrothiophenyl, pyrrolidinyl, oxathiolanyl, piperidinyl, 1(3H)-isobenzofuranonyl, and the like.

$R^9$ and $R^{10}$ are each independently H or an alkyl group having 1 to 6 carbon atoms. Here, examples of the alkyl group having 1 to 6 carbon atoms include methyl, ethyl, n-propyl, isopropyl, n-butyl, isobutyl, s-butyl, t-butyl, n-pentyl, n-hexyl, and the like.

r1 is an integer of 2 to 20, preferably 2 to 10, and more preferably 2 to 5.

$R^{11}$ to $R^{16}$ are each independently a halogen atom, an aliphatic hydrocarbon group having 1 to 20 carbon atoms which may have a substituent, an alkoxyl group having 1 to 20 carbon atoms which may have a substituent, or an aromatic hydrocarbon group having 6 to 12 carbon atoms which may have a substituent, and specific examples thereof are the same as those described for $R^7$ and $R^8$.

The diol compound that derives X having the formula $I^1$ includes, but is not particularly limited to, α,ω-bis[3-(o-hydroxyphenyl)propyl] polydimethylsiloxane, 9,9-bis[4-(2-hydroxyethoxy)phenyl]fluorene (BPEF), 9,9-bis[4-(2-hydroxyethoxy)-3-methylphenyl]fluorene, 9,9-bis[4-(2-hydroxyethoxy)-3-t-butylphenyl]fluorene, 9,9-bis[4-(2-hydroxyethoxy)-3-isopropylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 2,2-bis(4-(2-hydroxyethoxy)phenyl)propane, 4,4-bis(2-hydroxyethoxy)biphenyl, 2,2'(9H-fluorene-9,9'-diyl)bis(ethane-1-ol), 9H-fluorene-9,9-diyldimethanol, 2,2'-(1,4-phenylene)bis(ethane-1-ol), 2,2'-(1,4-phenylene)bis(methane-1-ol), phenylenebis(oxy))bis(ethane-1-ol), and the like. Among these, the diol compound that derives X having the formula $I^1$ is preferably 9,9-bis[4-(2-hydroxyethoxy)phenyl]fluorene (BPEF).

In one embodiment, the structure of the diol compound that derives X having Formula $I^1$ is shown below.

Chem 11

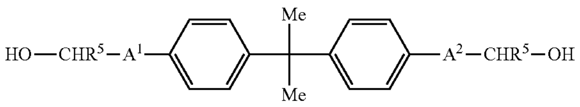

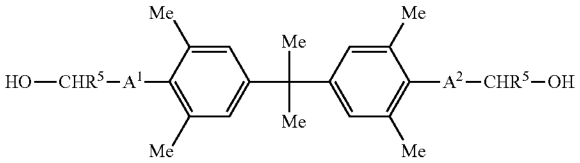

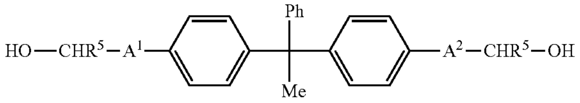

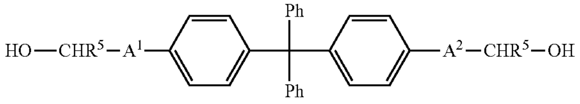

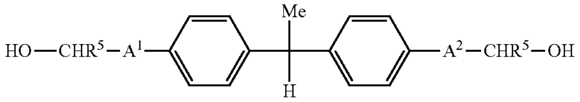

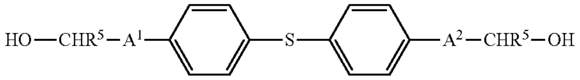

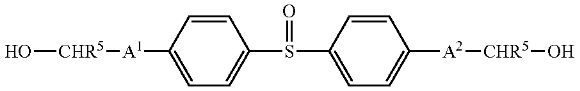

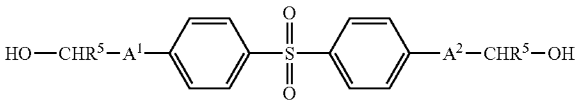

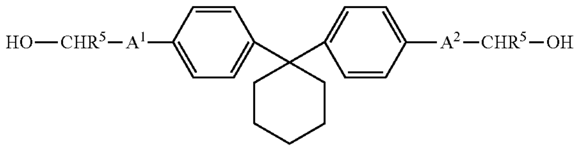

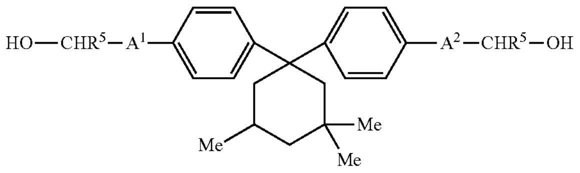

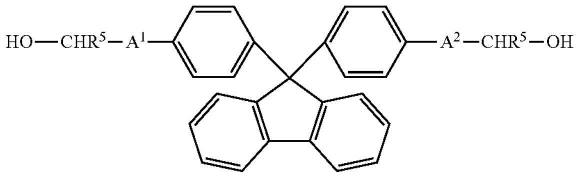

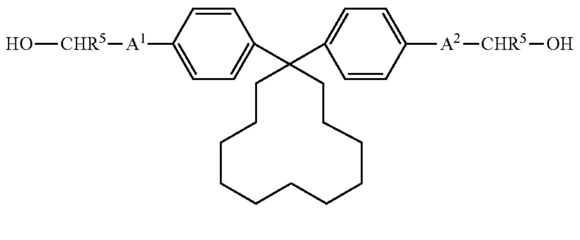

-continued

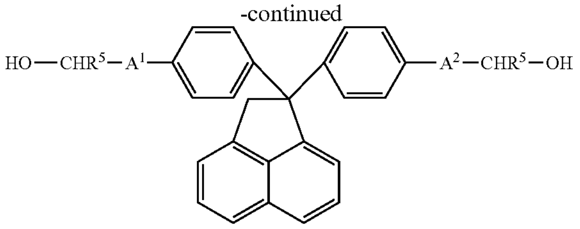

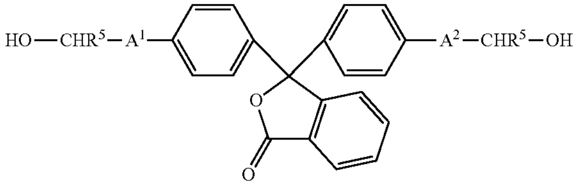

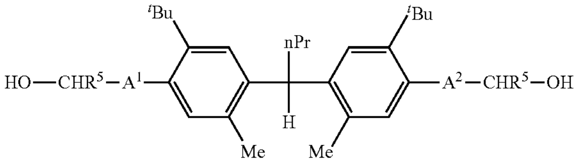

The diol compound that derives X having the formula $I^2$ includes, but is not particularly limited to, 9,9-bis[6-(1-hydroxymethoxy)naphthalene-2-yl]fluorene, 9,9-bis[6-(2-hydroxyethoxy) naphthalene-2-yl]fluorene, 9,9-bis[6-(3-hydroxypropoxy)naphthalene-2-yl]fluorene, 9,9-bis[6-(4-hydroxybutoxy)naphthalene-2-yl]fluorene, 2,2'-bis(2-hydroxyethoxy)-6,6'-diphenyl-1,1'-binaphthalene, and the like. Among them, the diol compound that derives X having the formula $I^2$ is preferably 9,9-bis[6-(2-hydroxyethoxy) naphthalene-2-yl]fluorene or 2,2'-bis(2-hydroxyethoxy)-6,6'-diphenyl-1,1'-binaphthalene.

$X^3$s are each independently a divalent aromatic hydrocarbon group having 15 to 32 carbon atoms.

The divalent aromatic hydrocarbon group having 15 to 32 carbon atoms includes, but is not particularly limited to, divalent condensed polycyclic aromatic hydrocarbon groups such as fluoranthenylene, acephenanthrylenylene, aceanthrylenylene, triphenylene, pyrenylene, chrysenylene, naphthacenylene, pleiadenylene, picenylene, perylenylene, biphenylene, pentaphenylene, pentacenylene, tetraphenylenylene, hexaphenylene, hexacenylene, rubicenylene, coronenylene, trinaphthyrenylene, heptaphenylene, heptacenylene, pyranthrenylene, ovalenylene, and the like; terphenylene, quarterphenylene, and the like.

The diol compound that derives X having the formula $I^3$ includes, but is not particularly limited to, binaphthalene diol compounds. Specific examples thereof include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, 2,2'-bis(4-hydroxybutoxy)-1,1'-binaphthalene, and the like. Among these, the diol compound that derives X having the formula $I^3$ is preferably 2,2'-bis(2-hydroxyethoxy)-1,1'-binaphthalene.

$X^4$s are each independently a divalent group containing one or more hydrocarbon rings or heterocycles.

The hydrocarbon ring or heterocycle incudes, but is not particularly limited to, divalent aromatic hydrocarbon groups having 6 to 32 carbon atoms which may have a substituent, divalent cycloalkyl groups having 3 to 20 carbon atoms which may have a substituent, and, divalent groups having one or more of each of divalent aromatic hydrocarbon groups having 6 to 32 carbon atoms which may have a substituent and divalent cycloalkyl groups having 3 to 20 carbon atoms.

The divalent aromatic hydrocarbon group having 6 to 32 carbon atoms may contain a hetero atom selected from an oxygen atom, a sulfur atom, and a nitrogen atom as long as the divalent aromatic hydrocarbon group exhibits aromaticity as a whole. The divalent aromatic hydrocarbon group having 6 to 32 carbon atoms is not particularly limited, but examples thereof may include the following groups.

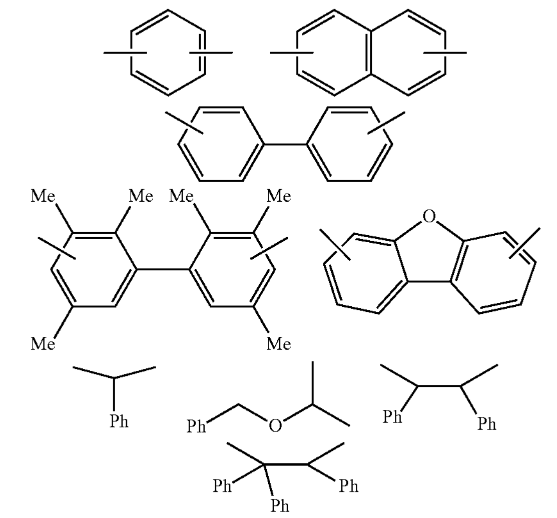

The divalent cycloalkyl group having 3 to 20 carbon atoms may contain a hetero atom selected from an oxygen atom, a sulfur atom, and a nitrogen atom. The divalent cycloalkyl group having 3 to 20 carbon atoms is not particularly limited, but examples thereof may include the following.

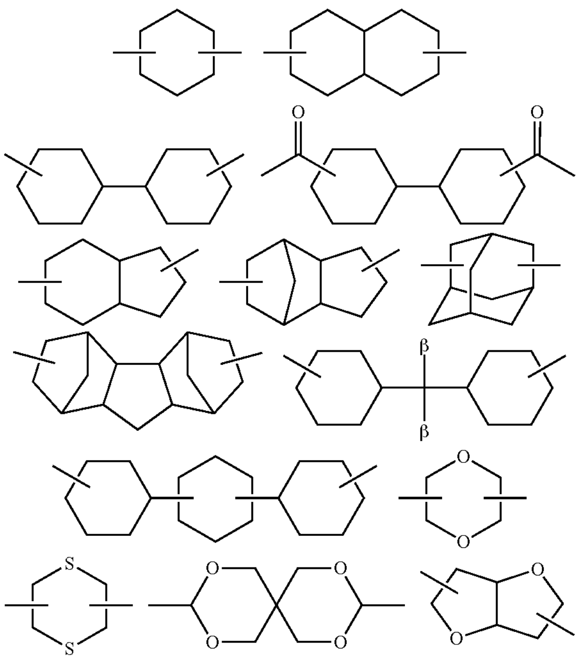

The divalent group having one or more of each of divalent aromatic hydrocarbon groups having 6 to 32 carbon atoms and divalent cycloalkyl groups having 3 to 20 carbon atoms is not particularly limited, but examples thereof include the following.

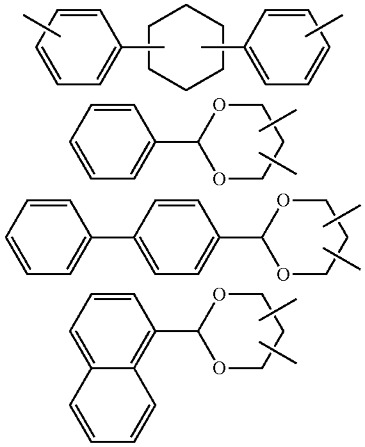

The substituent that can be possessed by the divalent aromatic hydrocarbon group having 6 to 32 carbon atoms, the divalent cycloalkyl group having 3 to 20 carbon atoms, and the divalent group having one or more of each of divalent aromatic hydrocarbon groups having 6 to 32 carbon atoms and divalent cycloalkyl groups having 3 to 20 carbon atoms is not particularly limited, and examples thereof include an alkyl group having 1 to 6 carbon atoms, an alkoxyl group having 1 to 6 carbon atoms, an acyl group having 1 to 7 carbon atoms, a halogen atom, an amino group, a nitro group, a cyano group, a carbamoyl group, and the like.

The divalent saturated heterocyclic group may be formed by bonding together with at least one selected from the group consisting of $R^5$, $R^{6A}$, and $R^{6B}$. For example, 1,4-cyclohexanedimethanol (CHDM), which is a diol compound that derives X having the formula $I^4$, bonds together with $R^5$, $R^{6A}$, and $R^{6B}$ such that X in the formula (I) has a cyclohexane ring.

$X^5$s are each independently a divalent saturated heterocyclic group.

The divalent saturated heterocyclic group is not particularly limited, but examples thereof include the following.

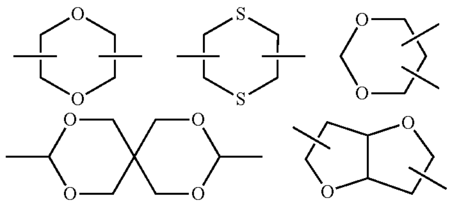

The divalent saturated heterocyclic group may be formed by bonding together with at least one selected from the group consisting of $R^5$, $R^{6A}$, and $R^{6B}$. For example, 2,4-dihydroxy-1,4-dioxane, which is a diol compound that derives X having the formula $I^4$, bonds together with $R^5$, $R^{6A}$, and $R^{6B}$ such that X in the formula (I) has a cyclohexane ring.

$X^6$s are each independently an alkylene group having 1 to 10 carbon atoms which may contain an oxygen atom.

The alkylene group having 1 to 10 carbon atoms which may contain an oxygen atom includes, but is not particularly limited to, alkylenes such as methylene, ethylene, propylene, isopropylene, butylene, and the like; oxygen atom-containing alkylenes such as oxymethylene ($-CH_2-O-$), oxyethylene ($-CH_2CH_2-O-$), dioxyethylene ($-CH_2CH_2-O-CH_2CH_2-O-$), trioxyethylene ($-CH_2CH_2-O-CH_2CH_2-O-CH_2CH_2-O-$), and the like.

In addition, s1 and s2 are each independently an integer of 0 to 10, preferably 0 to 5, and more preferably 0 to 3.

The diol compound that derives X having the formula $I^6$ includes ethylene glycol (EG), 1,3-propanediol (PG), 1,4-butanediol (BD), 2-butyl-2-ethyl-1,3-propanediol (BEPG), neopentyl glycol (NPG), and the like.

The siloxane block-containing diol compound described above may be contained alone or in combination of two or more thereof in the composition.

The weight average molecular weight (Mw) of the siloxane block-containing diol compound is preferably 10000 to 1000000, more preferably 30000 to 800000, and still more preferably 40000 to 250000. In the present specification, as the value of "weight average molecular weight (Mw)", a value measured by the method of Examples is adopted.

The number average molecular weight (Mn) of the siloxane block-containing diol compound is preferably 10000 to 500000, more preferably 20000 to 300000, and still more preferably 30000 to 200000. In the present specification, as the value of "number average molecular weight (Mn)", a value measured by the method of Examples is adopted.

The weight average molecular weight (Mw) (Mw/Mn) with respect to the number average molecular weight (Mn) of the siloxane block-containing diol compound is preferably 1 to 4, more preferably 1.05 to 3, and still more preferably 1.1 to 2.

Method for Producing Siloxane Block-Containing Diol Compound

According to an embodiment of the present invention, a method for producing the siloxane block-containing diol compound described above is provided.

The method for producing a siloxane block-containing diol compound includes a step of reacting (A) a cyclic siloxane compound and/or a linear siloxane compound, (B) a diol compound, and (C) a basic compound catalyst.

(A) Cyclic Siloxane Compound and/or Linear Siloxane Compound

The cyclic siloxane compound is represented by the following formula (1).

(1)

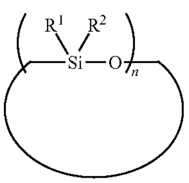

In the formula, $R^1$ and $R^2$ are each independently an alkyl group which may have a substituent, an alkenyl group which may have a substituent, or an aryl group which may have a substituent. At this time, $R^1$ and $R^2$ are preferably an alkyl group having 1 to 20 carbon atoms in total and an aryl group having 6 to 30 carbon atoms in total which may have a substituent.

The alkyl group having 1 to 20 carbon atoms in total which may have a substituent is preferably an alkyl group having 1 to 10 carbon atoms in total, more preferably an alkyl group having 1 to 6 carbon atoms in total, and still more preferably an alkyl group having 1 or 2 carbon atoms in total.

The aryl group having 6 to 30 carbon atoms in total is preferably an aryl group having 6 to 20 carbon atoms in total, more preferably an aryl group having 6 to 12 carbon atoms in total, and still more preferably an aryl group having 6 to 8 carbon atoms in total.

Examples of the substituent include a hydroxyl group, a halogen, an amino group, a vinyl group, a carboxyl group, a cyano group, a (meth)acryloxy group, a glycidyloxy group, a mercapto group, and the like.

Preferred specific examples of $R^1$ and $R^2$ include a methyl group, a phenyl group, a vinyl group, and a propyl group.

n is an integer of 3 to 30, preferably 3 to 15, more preferably 3 to 10, further preferably 3 to 8, and particularly preferably 3 to 5.

The molecular weight of the cyclic siloxane compound represented by the formula (1) is preferably 2000 or less, more preferably 1600 or less, still more preferably 1200 or less, and particularly preferably 1000 or less. The molecular weight of the cyclic siloxane compound represented by the formula (1) is preferably 100 or more, more preferably 150 or more, and still more preferably 200 or more.

Preferred specific examples of the cyclic siloxane compound represented by the formula (1) include decamethylcyclopentasiloxane (D5), octamethylcyclotetrasiloxane (D4), and octaphenylcyclotetrasiloxane (OPTS).

The linear siloxane compound is represented by the following formula (2).

(2)

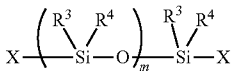

In the formula, $R^3$ and $R^4$ each independently represent a halogen atom, an aliphatic hydrocarbon group having 1 to 20 carbon atoms, an alkoxyl group having 1 to 20 carbon atoms, a cycloalkyl group having 3 to 20 carbon atoms, an aromatic hydrocarbon group having 6 to 20 carbon atoms, an aralkyl group having 7 to 20 carbon atoms, an aromatic hydrocarbon-oxy group having 6 to 20 carbon atoms, or a cycloalkoxyl group having 3 to 20 carbon atoms. At this time, $R^3$ and $R^4$ are preferably an alkyl group having 1 to 20 carbon atoms in total and an aryl group having 6 to 30 carbon atoms in total which may have a substituent.

The alkyl group having 1 to 20 carbon atoms in total which may have a substituent is preferably an alkyl group having 1 to 10 carbon atoms in total, more preferably an alkyl group having 1 to 8 carbon atoms in total, and still more preferably an alkyl group having 1 or 2 carbon atoms in total.

The aryl group having 6 to 30 carbon atoms in total is preferably an aryl group having 6 to 20 carbon atoms in total, more preferably an aryl group having 6 to 12 carbon atoms in total, and still more preferably an aryl group having 6 to 8 carbon atoms in total.

Examples of the substituent include a hydroxyl group, a halogen, an amino group, a vinyl group, a carboxyl group, a cyano group, a (meth)acryloxy group, a glycidyloxy group, a mercapto group, and the like.

Preferred specific examples of $R^3$ and $R^4$ include a methyl group, a phenyl group, a vinyl group, and a propyl group.

Xs each independently represent a hydrogen atom, a hydroxyl group, an alkoxy group having 1 to 10 carbon atoms which may have a substituent, a siloxy group having 1 to 10 carbon atoms which may have a substituent, a hydrocarbon group having 1 to 10 carbon atoms which may have a substituent, an oxygen atom-containing group having 1 to 10 carbon atoms which may have a substituent, a nitrogen atom-containing group having 1 to 10 carbon atoms which may have a substituent, or an amino group which may have a substituent. Among them, X is preferably a hydroxyl group, a siloxy group having 1 to 10 carbon atoms which may have a substituent, or a hydrocarbon group having 1 to 10 carbon atoms which may have a substituent, more preferably a hydroxyl group, a siloxy group having 1 to 5 carbon atoms which may have a substituent, or a hydrocarbon group having 1 to 5 carbon atoms which may have a substituent, and further preferably a hydroxyl group, a trimethylsilyloxy group, a triethylsilyloxy group, a t-butyldimethylsilyloxy group, methyl, ethyl, propyl, isopropyl, butyl, n-butyl, s-butyl, or t-butyl.

m is an integer of 2 to 10000, preferably 10 to 7000, more preferably 100 to 2000, and still more preferably 200 to 500.

The molecular weight of the linear siloxane compound represented by the formula (2) is preferably 60,000 or less, more preferably 56000 or less, still more preferably 50,000 or less, and particularly preferably 45000 or less. The molecular weight of the linear siloxane compound represented by the formula (2) is preferably 1000 or more, more preferably 5000 or more, and still more preferably 10,000 or more.

Preferred specific examples of the linear siloxane compound represented by the formula (2) include linear polydimethylsiloxane (linear PDSM).

The cyclic siloxane compound and the linear siloxane compound may be used singly or in combination of two or more kinds thereof

Diol Compound (B)

The diol compound is not particularly limited, and examples thereof include diol compounds represented by the following formulas ($J^1$) to ($J^6$).

($J^1$)

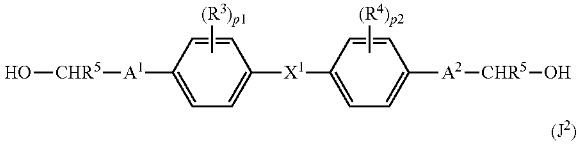

($J^2$)

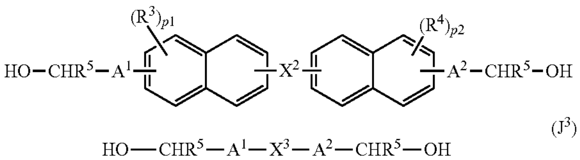

($J^3$)

$$HO—CHR^5—A^1—X^3—A^2—CHR^5—OH$$

($J^4$)

$$HO—CHR^5—A^1—X^4—A^2—CHR^5—OH$$

-continued ($J^5$)

$$HO—CHR^5—A^1—X^5—A^2—CHR^5—OH$$

($J^6$)

$$HO—CHR^5—[(X^6)_{s1}—CHR^5]_{s2}—OH$$

In the above formula, $A^1$ and $A^2$, $X^1$ to $X^6$, $R^3$ to $R^5$, p1 to p2, and s1 to s2 are the same as those described above.

Among them, the diol compound is preferably 9,9-bis[4-(2-hydroxyethoxy) phenyl]fluorene (BPEF), 1,4-cyclohexanedimethanol (CHDM), ethylene glycol (EG), 1,3-propanediol (PG), 1,4-butanediol (BD), 2-butyl-2-ethyl-1,3-propanediol (BEPG), or neopentyl glycol (NPG).

The above-mentioned diol compounds may be used singly or in combination of two or more kinds thereof.

(C) Basic Compound Catalyst

The basic compound catalyst has a function of promoting a reaction between the (A) cyclic siloxane compound and/or linear siloxane compound and the (B) diol compound.

Examples of the basic compound catalyst include an alkali metal compound, an alkaline earth metal compound, and the like.

The alkali metal compound includes, but is not particularly limited to, alkali metal hydroxides such as lithium hydroxide, sodium hydroxide, potassium hydroxide, and the like; alkali metal carbonates such as sodium carbonate, potassium carbonate, cesium carbonate, and the like; alkali metal hydrogen carbonates such as sodium hydrogen carbonate, potassium hydrogen carbonate, cesium hydrogen carbonate, and the like.

The alkaline earth metal compound includes, but is not particularly limited to, alkaline earth metal hydroxides such as magnesium hydroxide, calcium hydroxide, and the like; alkaline earth metal carbonates such as magnesium carbonate, calcium carbonate, and the like.

Among the above, the basic compound catalyst is preferably an alkali metal carbonate or an alkali metal hydrogen carbonate, more preferably sodium carbonate, potassium carbonate, cesium carbonate, sodium hydrogen carbonate, or potassium hydrogen carbonate, still more preferably potassium carbonate or cesium carbonate, and particularly preferably cesium carbonate. The above-mentioned basic compound catalysts may be used singly or in combination of two or more kinds thereof.

The addition amount of the basic compound catalyst is not particularly limited, but is preferably 1.5 to 100 times the mole, more preferably 2.0 to 50 times the mole, still more preferably 3.0 to 30 times the mole, and particularly preferably 4.0 to 20 times the mole with respect to the diol compound.

Reaction

The reaction is not particularly limited, but it is preferable to perform the reaction by heating the (A) cyclic siloxane compound and/or linear siloxane compound and the (B) diol compound in the presence of the (C) basic compound catalyst.

The reaction temperature is not particularly limited, and is preferably 30 to 300° C., more preferably 80 to 250° C., and still more preferably 100 to 230° C.

The reaction atmosphere is not particularly limited, but is preferably an inert gas atmosphere. Examples of the inert gas include a nitrogen gas, an argon gas, and the like.

By performing the reaction, a composition containing a siloxane block-containing diol compound can be produced.

Incidentally, impurities having a relatively low boiling point (a cyclic siloxane compound, and the like) among side reactants and unreacted raw materials that can be contained in the product obtained by the reaction may be appropriately removed by distillation under reduced pressure.

Siloxane-Based Thermoplastic Resin

According to an embodiment of the present invention, there is provided a siloxane-based thermoplastic resin containing a constituent unit derived from the siloxane block-containing diol compound described above.

The siloxane-based thermoplastic resin is not particularly limited, and examples thereof include a polycarbonate resin, a polyester carbonate resin, an acrylic resin such as polymethyl methacrylate (PMMA) and the like, polyethylene terephthalate (PET), triacetyl cellulose (TAC), polyethylene naphthalate (PEN), polyimide (PI), cycloolefin copolymer (COC), a norbornene-containing resin, polyether sulfone, cellophane, aromatic polyamide, and the like.

In one embodiment, the siloxane-based thermoplastic resin is a copolymer obtained by reacting a siloxane block-containing diol compound with the thermoplastic resin or a monomer thereof.

Hereinafter, a case where the siloxane-based thermoplastic resin is a siloxane-based polycarbonate resin will be described in detail.

The siloxane-based polycarbonate resin contains a constituent unit derived from a siloxane block-containing diol compound and a constituent unit derived from a carbonate compound.

The carbonate compound is not particularly limited as long as it can introduce the carbonyl group (—CO— group) of the polycarbonate constituent unit into the siloxane-based polycarbonate resin. For example, diaryl carbonates such as diphenyl carbonate, dibenzyl carbonate, ditolyl carbonate, bis(chlorophenyl) carbonate, m-cresyl carbonate, and the like; dialkyl carbonates such as dimethyl carbonate, diethyl carbonate, dibutyl carbonate, dicyclohexyl carbonate, and the like; monoaryl monoalkyl carbonates, and the like, are mentioned.

These carbonate compounds may be used singly or in combination of two or more kinds thereof.

The siloxane-based polycarbonate resin may further contain another constituent unit. The other constituent unit is not particularly limited, and examples thereof include a constituent unit derived from an aromatic diol compound, a constituent unit derived from a diaryloxysilane compound, and the like.

The weight average molecular weight of the siloxane-based polycarbonate resin is preferably 10000 to 1000000, more preferably 20000 to 800000, and still more preferably 30000 to 700000.

The molar ratio of the constituent unit derived from the siloxane block-containing diol compound of the siloxane-based polycarbonate resin to the constituent unit derived from the carbonate compound is preferably 0.01:99.99 to 99.99:0.01, more preferably 1:99 to 99:1, further preferably 10:90 to 90:10, and particularly preferably 30:70 to 70:30.

Since the siloxane-based thermoplastic resin described above contains a constituent unit derived from a siloxane block-containing diol compound, the siloxane-based thermoplastic resin can be excellent in chemical resistance, low-temperature impact resistance, weather resistance, flame retardancy, and the like.

Method for Producing Siloxane-Based Thermoplastic Resin

According to an embodiment of the present invention, a method for producing a siloxane-based thermoplastic resin is provided. The method for producing a siloxane-based thermoplastic resin includes a step of reacting a composition with a thermoplastic resin at 160 to 400° C. in the presence of a catalyst.

Composition

As the composition, a composition containing the above-described siloxane block-containing diol compound can be used.

Thermoplastic Resin

The thermoplastic resin is not particularly limited, and examples thereof include a polycarbonate resin, a polyester carbonate resin, an acrylic resin such as polymethyl methacrylate (PMMA) and the like, polyethylene terephthalate (PET), triacetyl cellulose (TAC), polyethylene naphthalate (PEN), polyimide (PI), a cycloolefin copolymer (COC), a norbornene-containing resin, polyether sulfone, cellophane, an aromatic polyamide, and monomeric monomers thereof.

Catalyst

The catalyst is not particularly limited, and examples thereof include an alkali metal compound, an alkaline earth metal compound, a nitrogen-containing compound, and a metal salt.

The alkali metal compound is not particularly limited, and examples thereof include sodium hydroxide, potassium hydroxide, cesium hydroxide, lithium hydroxide, sodium bicarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, sodium gluconate; a disodium salt, a dipotassium salt, a dicesium salt and a dilithium salt of bisphenol A; a sodium salt, a potassium salt, a cesium salt and a lithium salt of phenol; and the like.

The alkaline earth metal compound is not particularly limited, and examples thereof include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate, and the like.

The nitrogen-containing compound includes, but is not particularly limited to, quaternary ammonium hydroxides having an alkyl group and/or an aryl group, such as tetramethylammonium hydroxide, tetraethylammonium hydroxide, tetrapropylammonium hydroxide, tetrabutylammonium hydroxide, trimethylbenzylammonium hydroxide, and the like; tertiary amines such as triethylamine, dimethylbenzylamine, triphenylamine, and the like; secondary amines such as diethylamine, dibutylamine, and the like; primary amines such as propylamine, butylamine, and the like; Imidazoles such as 2-methylimidazole, 2-phenylimidazole, benzimidazole, and the like; bases or basic salts such as ammonia, tetramethylammonium borohydride, tetrabutylammonium borohydride, tetrabutylammonium tetraphenylborate, tetraphenylammonium tetraphenylborate, and the like.

The metal salt includes, but is not particularly limited to, zinc salts such as zinc acetate, zinc benzoate, zinc 2-ethylhexanoate, and the like; tin salts such as tin(II) chloride, tin(IV) chloride, tin(II) acetate, tin(IV) acetate, dibutyltin dilaurate, dibutyltin oxide, dibutyltin dimethoxide, and the like; zirconium salts such as zirconium acetylacetonate, zirconium oxyacetate, zirconium tetrabutoxide, and the like; lead salts such as lead(II) acetate, lead(IV) acetate, and the like.

The above-described catalysts may be used singly or in combination of two or more kinds thereof.

Reaction

The reaction is not particularly limited, but it is preferable to react the composition and the thermoplastic resin in the presence of a catalyst.

At this time, the reaction temperature is 160 to 400° C., preferably 200 to 350° C., more preferably 220 to 320° C., and still more preferably 240 to 310° C.

By performing the reaction, a siloxane-based thermoplastic resin can be produced.

EXAMPLES

Hereinafter, the present invention will be specifically described with reference to Examples, but the present invention is not limited thereto. Note that "%" is on a mass basis unless otherwise specified.

Measurement Conditions

Content of Polysiloxane and Cyclic Siloxane

Calculation was performed using NMR. Incidentally, the chemical shift in the following $^1$H-NMR analysis was based on 0 ppm which is a peak of TMS (tetramethylsilane).

In $^1$H-NMR, peaks derived from a methyl group on Si corresponding to polysiloxane, decamethylpentacyclosiloxane (D5) which is a cyclic siloxane, and octamethyltetracyclosiloxane (D4) are observed at 0.1 to 1.0 ppm, 0.079 ppm, and 0.094 ppm, respectively. The sum of the peak areas at 0.079 ppm and 0.094 ppm was defined as the content of the cyclic siloxane, and the value obtained by subtracting the peak areas at 0.079 ppm and 0.094 ppm from the peak area at 0.1 to 1.0 ppm was defined as the content of the polysiloxane, and based on this value, the production rate of the polysiloxane and the production rate of the cyclic siloxane were determined.

Weight Average Molecular Weight in Terms of Polystyrene (Mw, Mn, Mw/Mn)

A calibration curve was prepared using GPC (gel permeation chromatography), chloroform as a developing solvent, and standard polystyrene (Shodex STANDARD, SM-105) having a known molecular weight (molecular weight distribution=1). The elution time and the molecular weight value of each peak were plotted from the measured standard polystyrene, and approximation was performed by a cubic formula to obtain a calibration curve.

Then, based on the obtained calibration curve, the weight average molecular weight (Mw) was obtained as a polystyrene equivalent value from the following formula.

[Calculation Formula]

$$Mw=\Sigma(Wi\times Mi)/\Sigma(Wi)$$

$$Mn=\Sigma(Ni\times Mi)/\Sigma(Ni)$$

In the above formula, i represents the i-th division point when the molecular weight M is divided, Wi represents the i-th weight, Mi represents the i-th molecular weight, and Ni represents the i-th molecular number. The molecular weight M represents a molecular weight value in terms of polystyrene at the same elution time of the calibration curve.

Note that Mw/Mn represents a molecular weight dispersion degree. It is a parameter for determining whether the molecular weight distribution is wide or narrow, and a value closer to 1.0 indicates that the molecular weight distribution is narrow, and a larger value indicates that the molecular weight distribution is wide.

Measurement Conditions

- Apparatus: Labsolutions manufactured by Shimadzu Corporation
- Column: Guard column (Shodex GPC K-G4A)×1, analytical column (Shodex GPC K-805L)×2
- Solvent: Chloroform (HPLC grade)
- Injection amount: 10 μL
- Sample concentration: 2000 ppm
- Solvent flow rate: 1 mL/min
- Measurement temperature: 40° C.
- Detector: RI

Measurement of Glass Transition Temperature (Tg)

As a measurement sample, 5 to 12 mg of a test piece was weighed in a sample container for AI autosampler (RDC aluminum pan, cylindrical container with diameter of 6.8 mm and height of 2.5 mm), and the upper portion of the sample container was sealed with a cover for AI autosampler to prepare a sample.

The measurement was performed using a differential scanning calorimeter (DSC) under a nitrogen atmosphere (nitrogen flow rate: 50 ml/min), and 10.0 mg of sapphire was used as a standard substance for a reference cell. Then, the measurement sample adjusted to 30° C. was heated to 280° C. at 20° C./min, then cooled at 20° C./min, and cooled to 30° C. Thereafter, the temperature was raised to 280° C. at 10° C./min and measurement was performed.

Measuring apparatus: differential scanning calorimeter (DSC) (product name "DSC-7020", manufactured by Hitachi High-Tech Science Corporation)

Example 1

Here, 3.708 g (10 mmol, Si molar amount: 50 mmol) of decamethylcyclopentasiloxane (D5), 0.052 g (0.5 mmol) of neopentyl glycol (NPG) and 3.2582 mg (10 μmol) of cesium carbonate ($Ca_2CeO_3$) as catalyst were heated to 150° C., substituted with a nitrogen atmosphere. The mixture was stirred at 150° C. for 2 hours to obtain a composition containing a colorless oily siloxane block-containing diol compound (polysiloxane compound).

Example 2

Here, 37.05 g (100 mmol, Si molar amount: 500 mmol) of decamethylcyclopentasiloxane (D5), 3.205 g (20 mmol) of 2-butyl-2-ethyl-1,3-propanediol (BEPG) and 1.3 mg (4 μmol) of cesium carbonate ($Ca_2CeO_3$) as catalyst were heated to 200° C., substituted with a nitrogen atmosphere. The mixture was stirred at 200° C. for 1 hour, then cooled to room temperature, and 17.5 mg (0.29 mmol) of acetic acid was added. By heating at 80° C. for 2 hours under reduced pressure (2 hPa), a composition containing a siloxane block-containing diol compound (polysiloxane compound) was produced while most of the cyclic siloxane was distilled off.

Examples 3 to 17, Comparative Examples 1 to 4

The procedure was performed in the same manner as in Example 1 except that the raw materials, the reaction temperature, and the reaction time were changed to those shown in Table 1.

BPA: bisphenol A
HQ: hydroquinone
AD: 1.3 adamantanediol
PHEP: 2-(4-hydroxyphenyl) ethanol
(C) Basic compound catalyst
$Cs_2CO_3$: cesium carbonate
$K_2CO_3$: potassium carbonate The compositions obtained in Examples 1 to 17 and Comparative Examples 1 to 4 were analyzed by $^1$H-NMR and GPC. The obtained results are shown in Table 2 below.

TABLE 2

| | NMR measurement (%) | | GPC measurement | | |
|---|---|---|---|---|---|
| | Poly-siloxane | Cyclic siloxane | Poly-siloxane Mw | Poly-siloxane Mn | Mw/Mn |
| Example 1 | 83 | 17 | 145666 | 101256 | 1.44 |
| Example 2 | 98 | 2 | 48501 | 28286 | 1.71 |
| Example 3 | 85 | 15 | 54333 | 45265 | 1.20 |
| Example 4 | 89 | 11 | 92789 | 60267 | 1.54 |

TABLE 1

| | (A) Siloxane compound | | (B) Diol compound | | (C) Basic compound catalyst | | A/B | | | |
|---|---|---|---|---|---|---|---|---|---|---|
| | Type | mmol (Si molar amount) | Type | mmol | Type | μmol | A/B (Si molar amount ratio) | C/(A + B) (weight ratio) | Reaction temperature (° C.) | Reaction time (hour) |
| Example 1 | D5 | 50 | NPG | 0.5 | $Cs_2CO_3$ | 10 | 100 | 905 | 200 | 1.5 |
| Example 2 | D5 | 500 | BEPG | 20 | $Cs_2CO_3$ | 4 | 25 | 32 | 200 | 1 |
| Example 3 | D5 | 1500 | NPG | 30 | $Cs_2CO_3$ | 330 | 50 | 941 | 150 | 2 |
| Example 4 | D5 | 100 | NPG | 2 | $Cs_2CO_3$ | 8 | 50 | 341 | 200 | 2 |
| Example 5 | D5 | 750 | NPG | 15 | $Cs_2CO_3$ | 17 | 50 | 95 | 180 | 4 |
| Example 6 | D5 | 100 | NPG | 2 | $Cs_2CO_3$ | 1 | 50 | 53 | 200 | 2 |
| Example 7 | D4 | 50 | NPG | 1 | $Cs_2CO_3$ | 10 | 50 | 892 | 200 | 1 |
| Example 8 | D5 + OPTS | 50 + 12 | NPG | 1 | $Cs_2CO_3$ | 10 | 62 | 541 | 200 | 2 |
| Example 9 | Linear PDMS | 50 | NPG | 1 | $Cs_2CO_3$ | 10 | 50 | 892 | 200 | 1 |
| Example 10 | D5 | 50 | EG | 0.5 | $Cs_2CO_3$ | 10 | 100 | 905 | 200 | 1.5 |
| Example 11 | D5 | 50 | PG | 0.5 | $Cs_2CO_3$ | 10 | 100 | 905 | 200 | 1.5 |
| Example 12 | D5 | 50 | BEPG | 0.5 | $Cs_2CO_3$ | 10 | 100 | 905 | 200 | 4 |
| Example 13 | D5 | 50 | BD | 0.5 | $Cs_2CO_3$ | 10 | 100 | 905 | 200 | 4 |
| Example 14 | D5 | 50 | CHDM | 0.5 | $Cs_2CO_3$ | 10 | 100 | 905 | 200 | 1.5 |
| Example 15 | D5 | 50 | BPEF | 0.5 | $Cs_2CO_3$ | 10 | 100 | 905 | 200 | 4 |
| Example 16 | D5 | 50 | NPG | 1 | $K_2CO_3$ | 10 | 50 | 866 | 200 | 5 |
| Example 17 | D5 | 50 | CHD | 1 | $Cs_2CO_3$ | 11 | 50 | 941 | 200 | 2 |
| Comparative Example 1 | D5 | 50 | BPA | 0.5 | $Cs_2CO_3$ | 10 | 100 | 905 | 200 | 2 |
| Comparative Example 2 | D5 | 50 | HQ | 0.5 | $Cs_2CO_3$ | 10 | 100 | 905 | 200 | 4 |
| Comparative Example 3 | D5 | 50 | AD | 1 | $Cs_2CO_3$ | 11 | 50 | 941 | 200 | 2 |
| Comparative Example 4 | D5 | 50 | PHEP | 1 | $Cs_2CO_3$ | 10 | 50 | 893 | 200 | 4 |

The abbreviations in Table 1 are as follows.
(A) Siloxane compound
D5: decamethylcyclopentasiloxane
D4: octamethylcyclotetrasiloxane
OPTS: octaphenylcyclotetrasiloxane
Linear PDSM: linear polydimethylsiloxane
(B) Diol compound
NPG: neopentyl glycol
BEPG: 2-butyl-2-ethyl-1,3-propanediol
EG: ethylene glycol
PG: 1,3-propanediol
BD: 1,4-butanediol
CHDM: 1,4-cyclohexanedimethanol
BPEF: 9,9-bis[4-(2-hydroxyethoxy)phenyl]fluorene TABLE 2-continued

| | NMR measurement (%) | | GPC measurement | | |
|---|---|---|---|---|---|
| | Poly-siloxane | Cyclic siloxane | Poly-siloxane Mw | Poly-siloxane Mn | Mw/Mn |
| Example 5 | 91 | 9 | 69595 | 44147 | 1.58 |
| Example 6 | 85 | 15 | 79300 | 54073 | 1.47 |
| Example 7 | 89 | 11 | 109309 | 64434 | 1.70 |
| Example 8 | 85 | 15 | 113369 | 90916 | 1.25 |
| Example 9 | 87 | 13 | 113649 | 63674 | 1.78 |
| Example 10 | 78 | 22 | 205512 | 165759 | 1.24 |

TABLE 2-continued

| | NMR measurement (%) | | GPC measurement | | |
|---|---|---|---|---|---|
| | Poly-siloxane | Cyclic siloxane | Poly-siloxane Mw | Poly-siloxane Mn | Mw/Mn |
| Example 11 | 85 | 15 | 139405 | 108771 | 1.28 |
| Example 12 | 85 | 15 | 159279 | 108553 | 1.47 |
| Example 13 | 86 | 14 | 146621 | 126379 | 1.16 |
| Example 14 | 81 | 19 | 135545 | 106889 | 1.27 |
| Example 15 | 86 | 14 | 107823 | 78281 | 1.38 |
| Example 16 | 14 | 86 | 93860 | 72296 | 1.30 |
| Example 17 | 28 | 72 | 77483 | 31927 | 2.43 |
| Comparative Example 1 | 0 | 100 | — | — | — |
| Comparative Example 2 | 0 | 100 | — | — | — |
| Comparative Example 3 | 0 | 100 | — | — | — |
| Comparative Example 4 | 0 | 100 | — | — | — |

From the results in Table 2, it can be seen that in Examples 1 to 17, the siloxane block-containing diol compound was suitably produced.

Comparison between Examples 1 and 10 to 15 in which a primary alcohol is used as the diol compound (B) and Example 17 in which a secondary alcohol is used as the diol compound (B) shows that Examples 1 and 10 to 15 can produce a siloxane block-containing diol compound in high yield.

Example a

A polycarbonate copolymer was produced using the composition produced in Example 2 (most of the cyclic siloxane was distilled off) and a polycarbonate compound.

Specifically, 2.00 g of the composition produced in Example 2 and 20.01 g of polycarbonate (molecular weight=Mw 18,783, Mn 10,227, containing 0.167 μmol of cesium carbonate as catalyst with respect to the number of moles of charged bisphenol A, Tg=122° C.) were heated to 230° C. under reduced pressure (2 hPa). By stirring at 230° C. for 2 hours, a white siloxane block copolymerized polycarbonate was obtained.

As a result of measuring Mw and Mn of the siloxane block copolymerized polycarbonate using GPC, Mw was 44,619 and Mn was 25,003.

Example b

A polycarbonate copolymer was produced using the composition produced in Example 2 and a polycarbonate compound.

Here, 20.00 g of polycarbonate (molecular weight=Mw 18,783, Mn 10,227, containing 0.167 μmol of cesium carbonate as catalyst with respect to the number of moles of charged bisphenol A, Tg=122° C.) was heated to 240° C. under a nitrogen atmosphere to be melted. After the polycarbonate was melted, 10.00 g of the composition produced in Example 2 was dropped with a dropping funnel. The pressure was gradually reduced at 240° C., and after reaching 2 hPa, the temperature was raised to 260° C., and the mixture was stirred for 1 hour to obtain a white siloxane block copolymerized polycarbonate.

As a result of measuring Mw and Mn of the siloxane block copolymerized polycarbonate using GPC, Mw was 101,401 and Mn was 57,702.

Example c

A polycarbonate copolymer was produced using the composition produced in Example 2 and a polycarbonate compound.

Specifically, 2.50 g of the composition produced in Example 2 and 10.00 g of polycarbonate (molecular weight=Mw 18,783, Mn 10,227, containing 0.167 μmol of cesium carbonate as catalyst with respect to the number of moles of charged bisphenol A, Tg=122° C.) were heated to 260° C. under reduced pressure (2 hPa). By stirring at 260° C. for 1 hour and 20 minutes, a white powdery siloxane block copolymerized polycarbonate was obtained.

As a result of measuring Mw and Mn of the siloxane block copolymerized polycarbonate using GPC, Mw was 356,597 and Mn was 79,718. Tg was 140° C.

The invention claimed is:

1. A composition comprising a siloxane block-containing diol compound, wherein the siloxane block-containing diol compound is represented by the following formula (I):

(I)

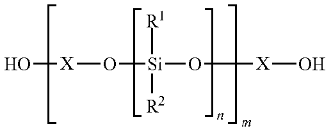

wherein $R^1$ and $R^2$ are each independently an alkyl group having 1 to 20 carbon atoms which may have a substituent, or an aryl group having 6 to 30 carbon atoms which may have a substituent, m is an integer of 1 to 25, n is an integer of 3 to 200, the Xs each independently represent any of the following formulae ($I^1$) to ($I^5$):

($I^1$)

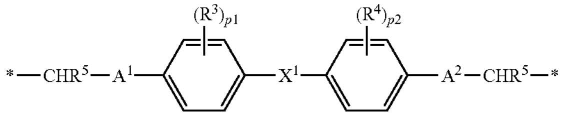

($I^2$)

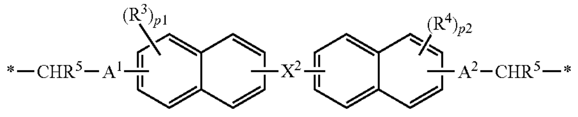

($I^3$)

$$*—CHR^5—A^1—X^3—A^2—CHR^5—*$$

($I^4$)

$$*—CHR^5—A^1—X^4—A^2—CHR^5—*$$

($I^5$)

$$*—CHR^5—A^1—X^5—A^2—CHR^5—*$$

$A^1$ and $A^2$ are each independently $—(CR^{6A}R^{6B})_{q1}—$ or $—(O—(CR^{6A}R^{6B})_{q2})_{q3}—$, wherein $R^{6A}$ and $R^{6B}$ are each independently H or an alkyl group having 1 to 6 carbon atoms, q1 is an integer of 0 to 10, q2 is an integer of 0 to 10, and q3 is an integer of 0 to 10, $R^3$ and $R^4$ each independently represent a halogen atom, an aliphatic hydrocarbon group having 1 to 20 carbon atoms, an alkoxyl group having 1 to 20 carbon atoms, a cycloalkyl group having 3 to 20 carbon atoms, an aromatic hydrocarbon group having 6 to 20 carbon atoms, an aralkyl group having 7 to 20 carbon atoms, an aromatic hydrocarbon-oxy group having 6 to 20 carbon atoms, or a cycloalkoxyl group having 3 to 20 carbon atoms, p1 and p2 are each independently an integer of 0 to 4, $R^5$s each independently represent H or an alkyl group having 1 to 6 carbon atoms, $X^1$ and $X^2$ are each independently a single bond or a group shown below:

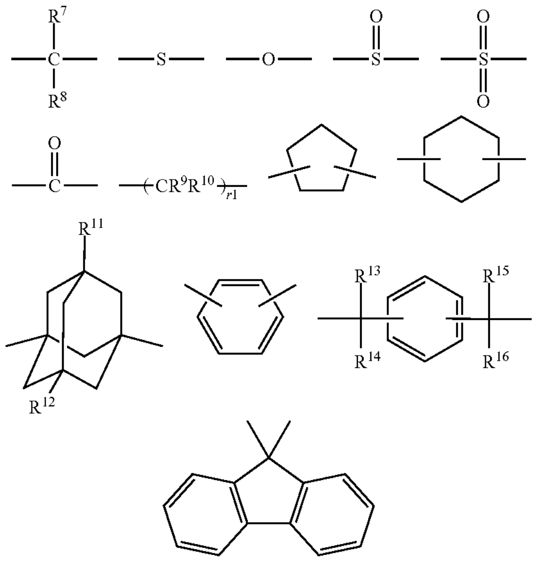

wherein $R^7$ and $R^8$ are each independently H, a halogen atom, an aliphatic hydrocarbon group having 1 to 20 carbon atoms which may have a substituent, an alkoxyl group having 1 to 20 carbon atoms which may have a substituent, or an aromatic hydrocarbon group having 6 to 20 carbon atoms which may have a substituent, or $R^7$ and $R^8$ may be bonded to each other to form a carbocyclic ring having 3 to 20 carbon atoms or a 5 to 12 membered heterocycle, $R^9$ and $R^{10}$ each independently represent H or an alkyl group having 1 to 6 carbon atoms, $R^{11}$ to $R^{16}$ each independently represent a halogen atom, an aliphatic hydrocarbon group having 1 to 20 carbon atoms which may have a substituent, an alkoxyl group having 1 to 20 carbon atoms which may have a substituent, or an aromatic hydrocarbon group having 6 to 12 carbon atoms which may have a substituent, r1 is an integer of 2 to 20, the $X^3$s each independently represent a divalent aromatic hydrocarbon group having 15 to 32 carbon atoms, the $X^4$s each independently represent a divalent group containing one or more hydrocarbon rings or heterocycles, wherein the divalent group containing one or more hydrocarbon rngs or heterocycles is selected from the group consisting of the following structures:

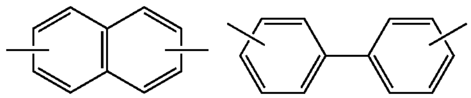

-continued

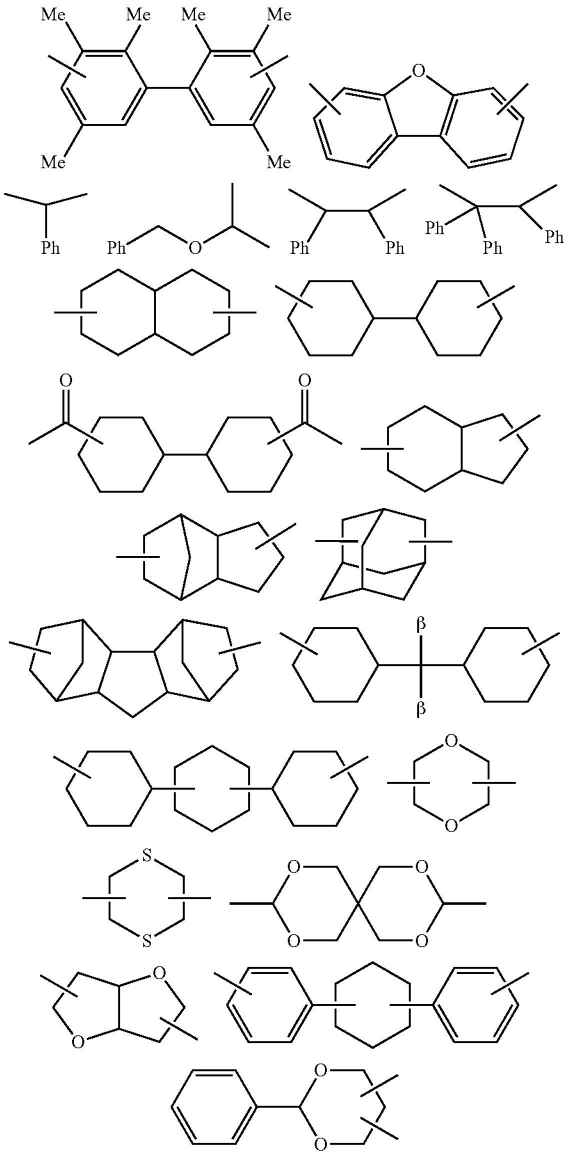

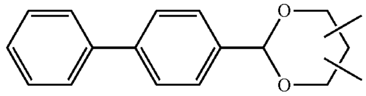

and

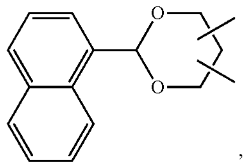

, $X^5$s each independently represent a divalent saturated heterocyclic group.

2. A siloxane-based thermoplastic resin comprising a constituent unit derived from the siloxane block-containing diol compound according to claim 1.

3. A method for producing the composition according to claim 1, comprising reacting (A) a cyclic siloxane compound represented by the following formula (1):

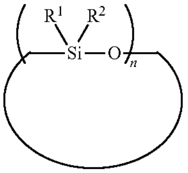

(1)

wherein $R^1$ and $R^2$ are each independently an alkyl group which may have a substituent, an alkenyl group which may have a substituent, or an aryl group which may have a substituent, and n is an integer of 3 to 30, and/or a linear siloxane compound represented by the following formula (2):

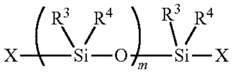

(2)

wherein $R^3$ and $R^4$ are each independently an alkyl group which may have a substituent, an alkenyl group which may have a substituent, or an aryl group which may have a substituent, the Xs each independently represent a hydrogen atom, a hydroxyl group, an alkoxy group having 1 to 10 carbon atoms which may have a substituent, a siloxy group having 1 to 10 carbon atoms which may have a substituent, a hydrocarbon group having 1 to 10 carbon atoms which may have a substituent, an oxygen atom-containing group having 1 to 10 carbon atoms which may have a substituent, a nitrogen atom-containing group having 1 to 10 carbon atoms which may have a substituent, or an amino group which may have a substituent, and m is an integer of 2 to 10000, and (B) a diol compound represented by the following formulae ($J^1$) to ($J^5$):

($J^1$)

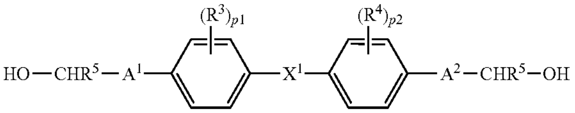

($J^2$)

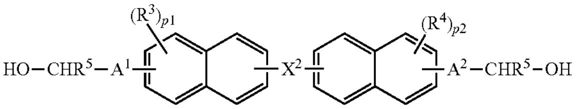

($J^3$)

$$HO—CHR^5—A^1—X^3—A^2—CHR^5—OH$$

($J^4$)

$$HO—CHR^5—A^1—X^4—A^2—CHR^5—OH$$

($J^5$)

$$HO—CHR^5—A^1—X^5—A^2—CHR^5—OH$$

wherein $A^1$ and $A^2$, $X^1$ to $X^5$, $R^3$ to $R^5$, and p1 to p2, are the same as defined in claim 1, and (C) a basic compound catalyst.

4. A method for producing a siloxane-based thermoplastic resin, comprising a reacting the composition according to claim 1 with a thermoplastic resin at 160 to 400° C. in the presence of a catalyst.

* * * * *